United States Patent
Lu et al.

(10) Patent No.: US 9,813,718 B2
(45) Date of Patent: Nov. 7, 2017

(54) APPARATUS AND METHOD FOR COMPACT BIT-PLANE DATA COMPRESSION

(71) Applicant: SAMSUNG DISPLAY CO., LTD., Yongin, Gyeonggi-Do (KR)

(72) Inventors: Ning Lu, Saratoga, CA (US); Ken Hu, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 496 days.

(21) Appl. No.: 14/451,150

(22) Filed: Aug. 4, 2014

(65) Prior Publication Data

US 2015/0098498 A1    Apr. 9, 2015

Related U.S. Application Data

(60) Provisional application No. 61/886,580, filed on Oct. 3, 2013.

(51) Int. Cl.
*H04N 19/13* (2014.01)
*H04N 19/18* (2014.01)
*H04N 19/436* (2014.01)
*H04N 19/93* (2014.01)
*H04N 19/34* (2014.01)

(52) U.S. Cl.
CPC ............ *H04N 19/18* (2014.11); *H04N 19/13* (2014.11); *H04N 19/34* (2014.11); *H04N 19/436* (2014.11); *H04N 19/93* (2014.11)

(58) Field of Classification Search
CPC combination set(s) only.
See application file for complete search history.

(56) References Cited

U.S. PATENT DOCUMENTS

| | | | | |
|---|---|---|---|---|
| 4,420,771 A | * | 12/1983 | Pirsch | H03M 7/3066 341/106 |
| 4,941,124 A | * | 7/1990 | Skinner, Jr. | G06F 17/30985 365/189.12 |
| 2002/0122483 A1 | * | 9/2002 | Tanaka | H04N 19/13 375/240.03 |
| 2003/0026490 A1 | * | 2/2003 | Thyagarajan | H04N 19/176 382/244 |

(Continued)

FOREIGN PATENT DOCUMENTS

| JP | 2007-267384 A | 10/2007 |
|---|---|---|
| KR | 10-1999-0075483 A | 10/1999 |

(Continued)

OTHER PUBLICATIONS

Extended European Search Report dated Nov. 20, 2014 for European Patent Application No. EP 14185887.8, 6 pages.

(Continued)

*Primary Examiner* — Sath V Perungavoor
*Assistant Examiner* — Janese Duley
(74) *Attorney, Agent, or Firm* — Lewis Roca Rothgerber Christie LLP

(57) ABSTRACT

An encoder includes a plurality of registers and is configured to: sequentially receive an array of coefficients, each of the coefficients being decomposed into a plurality of bits located at a plurality of corresponding bit positions of the coefficient; and concurrently operate on the plurality of bits of each of the coefficients.

9 Claims, 4 Drawing Sheets

(56) References Cited

U.S. PATENT DOCUMENTS

| | | | |
|---|---|---|---|
| 2003/0035476 A1 | 2/2003 | Ohyama et al. | |
| 2005/0175250 A1* | 8/2005 | Watanabe | H04N 19/63 382/247 |
| 2008/0267300 A1 | 10/2008 | Benndorf | |
| 2009/0238270 A1* | 9/2009 | Nishi | H03M 7/30 375/240.12 |
| 2011/0090955 A1* | 4/2011 | Liu | H04N 19/139 375/240.03 |
| 2011/0091121 A1* | 4/2011 | Fukuhara | H04N 19/647 382/234 |
| 2011/0091123 A1* | 4/2011 | Fukuhara | H04N 19/63 382/248 |
| 2013/0128958 A1* | 5/2013 | Gamei | H04N 19/00951 375/240.03 |
| 2013/0163892 A1* | 6/2013 | Hosaka | G06T 9/005 382/246 |

FOREIGN PATENT DOCUMENTS

| | | |
|---|---|---|
| KR | 10-2009-0014602 A | 2/2009 |
| KR | 10-0928324 | 11/2009 |

OTHER PUBLICATIONS

Korean Patent Abstract for KR Publication No. 10-2009-0034083 dated Apr. 7, 2009, corresponding to Korean Patent Registration No. 10-0928324 dated Nov. 25, 2009 as listed above.

\* cited by examiner

APPARATUS AND METHOD FOR COMPACT BIT-PLANE DATA COMPRESSION

CROSS-REFERENCE TO RELATED APPLICATION(S)

This patent application claims priority to and the benefit of U.S. Provisional Application Ser. No. 61/886,580, filed Oct. 3, 2013, titled "Compact Bitplane Coding Design for Fixed Bitrate Image and Video Compression," the entire content of which is incorporated herein by reference.

BACKGROUND

1. Field

Embodiments of the present invention relate to an apparatus and a method for data compression.

2. Related Art

Data compression, or source coding, is a ubiquitous process in computing that involves encoding information using fewer bits than the original representation. Data may be compressed for a variety of reasons, including, for example, reducing resource usage such as data storage space or transmission capacity. However, because data compression (e.g., encoding) requires data decompression (e.g., decoding) for the data to be usable, data compression is subject to a balance between space and time (e.g., data compression may save computer space, but may also increase processing time due to decompression).

The design of data compression processes also involve other considerations, including the degree of compression, the amount of distortion introduced (e.g., when using lossy data compression), and the computational resources used, to compress and decompress the data. Accordingly, there is a continual need for data compression schemes that can reduce storage space while increasing data accuracy after decompression and while decreasing processing power and time used to compress and decompress data.

SUMMARY

Embodiments of the present invention provide an apparatus and method for bit-plane coding for data compression that decrease the amount of space used in the process, while increasing data accuracy after decompression, and while decreasing processing power and time used to compress and decompress the data (e.g., being "compact").

According to one embodiment of the present invention, an encoder includes a plurality of registers and is configured to: sequentially receive an array of coefficients, each of the coefficients being decomposed into a plurality of bits located at a plurality of corresponding bit positions of the coefficient; and concurrently operate on the plurality of bits of each of the coefficients.

The encoder may be further configured to, in response to detecting a bit of the plurality of bits being 0, increase by 1 a register corresponding to a bit position of the plurality of bit positions corresponding to the bit from among the plurality of registers.

The encoder may be further configured to, in response to detecting the bit of the plurality of bits being 1, generate a coded symbol by encoding a value of the register corresponding to the bit position corresponding to the bit.

The encoder may be further configured to, in response to detecting the bit of the plurality of bits being 1, reset the register corresponding to the bit position corresponding to the bit to zero.

The value of the register corresponding to the bit position corresponding to the bit position of the bit may represent a zero run of the bit position.

The bit positions of each coefficient may form a plurality of respective bit-plane levels, and the encoder may be further configured to generate a plurality of coded bit-plane levels including a plurality of coded symbols.

The encoder may be further configured to, in response to detecting an end of the sequence of coefficients, send a plurality of end of sequence (EOS) signals to the plurality of coded bit-plane levels.

The encoder may be further configured to, in response to detecting the end of sequence of coefficients, reset the plurality of registers to zero.

A first bit position of the plurality of bit positions may represent a sign of each coefficient.

According to another embodiment of the present invention, a decoder is configured to: receive a sequence of coded symbols arranged in a plurality of bit-planes, each of the bit-planes corresponding to a bit position of a plurality of coefficients; read a coded symbol of the sequence of coded symbols corresponding to a bit-plane of the plurality of bit-planes; in response to detecting the coded symbol as being a run value, output a number of 0-bit bits equal to the run value; and after outputting the number of 0-bit bits, output a 1-bit.

The decoder may be further configured to, in response to detecting the coded symbol as being an end of sequence (EOS) symbol, read a next coded symbol of the sequence of coded symbols corresponding to a next bit-plane of the plurality of bit-planes.

The decoder may be further configured to, in response to detecting the EOS symbol as corresponding to a last bit-plane of the plurality of bit-planes, receive another sequence of coded symbols.

According to another embodiment of the present invention, a method of encoding using an encoder including a plurality of registers includes: sequentially receiving an array of coefficients, each of the coefficients being decomposed into a plurality of bits located at a plurality of corresponding bit positions of the coefficient; and concurrently operating on the plurality of bits of each of the coefficients.

The method may further include, in response to detecting a bit of the plurality of bits being 0, increasing by 1 a register corresponding to a bit position of the plurality of bit positions corresponding to the bit.

The method may further include, in response to detecting the bit of the plurality of bits being 1, generating a coded symbol by encoding a value of the register corresponding to the bit position corresponding to the bit.

The method may further include, in response to detecting the bit of the plurality of bits being 1, resetting the register to zero.

The value of the register may represent a zero run of the bit position.

The bit positions of each coefficient may form a plurality of respective bit-plane levels, and the method may further include generating a plurality of coded bit-plane levels including a plurality of coded symbols.

The method may further include, in response to detecting an end of the sequence of coefficients, sending a plurality of end of sequence (EOS) signals to the plurality of coded bit-plane levels.

The method may further include, in response to detecting the end of the sequence of coefficients, resetting the plurality of registers to zero.

A first bit position of the plurality of bit positions may represent a sign of each coefficient.

BRIEF DESCRIPTION OF THE DRAWINGS

The above and other aspects of embodiments of the present invention will become more apparent by describing in detail example embodiments thereof with reference to the accompanying drawings, in which.

DETAILED DESCRIPTION

Figure 1:
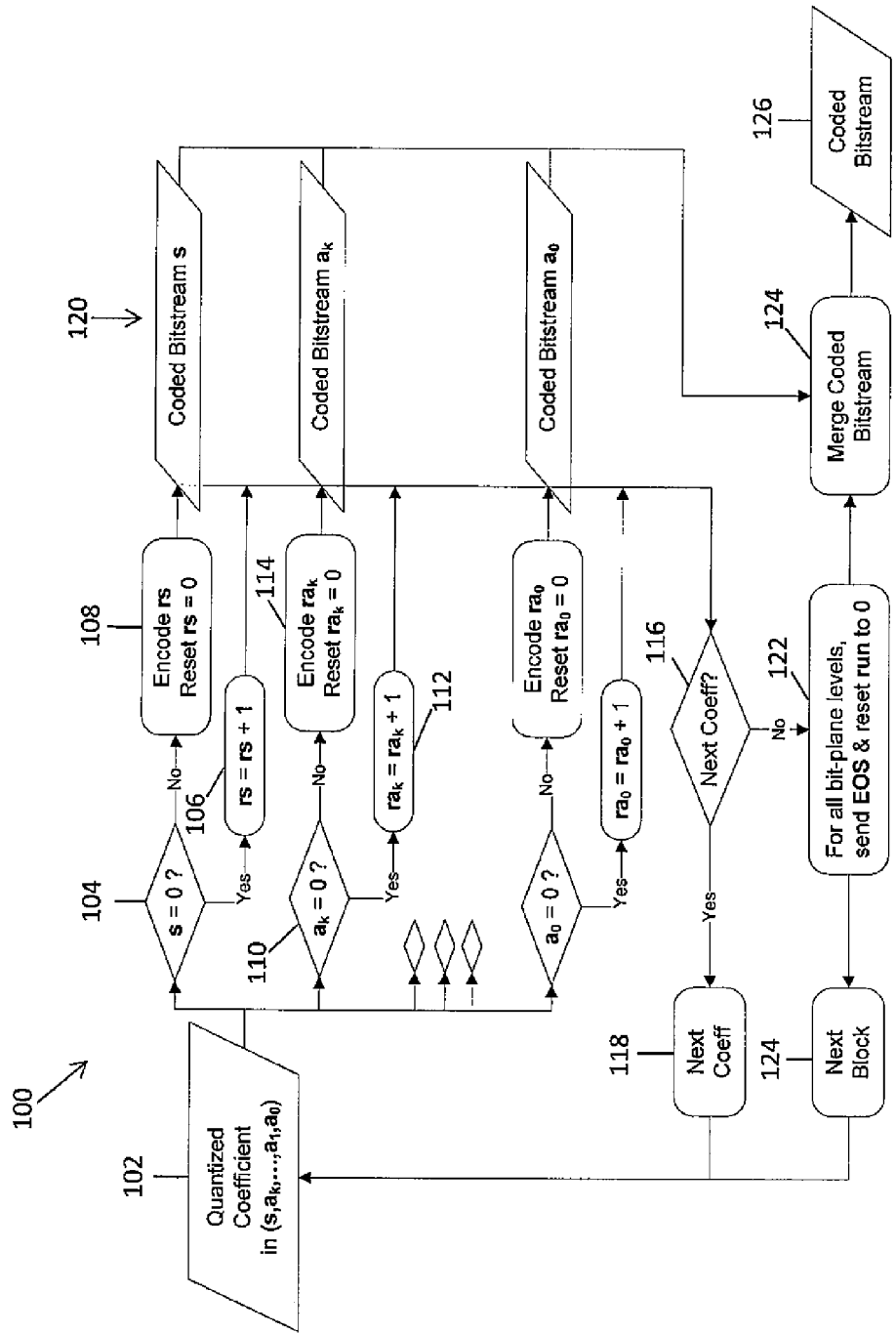
FIG. 1 is a flowchart illustrating an encoding process according to an embodiment of the present invention.

Hereinafter, embodiments of the present invention will be described more fully with reference to the accompanying drawings, in which, example embodiments of the present invention are shown. As those skilled in the art would realize, the described embodiments are susceptible to various modifications and alternative forms without departing from the spirit or scope of the present invention. For clarity of the description of the present invention, some elements or features not required for the complete understanding of the present invention may be omitted.

The terms used in the present specification are used to describe particular embodiments, and are not intended to limit the present invention. For example, it will be understood that, although the terms "first," "second," etc. may be used herein to describe various elements, these elements would not be limited by the strict construction of these terms. Instead, these terms are used only to distinguish one component from another. Further, an expression used in the singular encompasses the expression of the plural, unless it has a clearly different meaning in the context. In the present specification, it is to be understood that the terms such as "comprising," "including," "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when an element or layer is referred to as being "on," "connected to," or "coupled to" another element or layer, it can be directly on, connected to, or coupled to the other element or layer, or one or more intervening elements or layers may also be present. When an element is referred to as being "directly on," "directly connected to", or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Further, when describing embodiments of the present invention, the use of "may" relates to "one or more embodiments of the present invention."

Like reference numerals in the drawings denote like elements, and repeated descriptions thereof may be omitted.

Typical data compression schemes for the compression of images and video involve first translating original pixel data into transformation coefficients. For example, the intra block data or the residual inter block data may be first transformed from pixel intensity values to frequency coefficients using some two-dimensional transformations, such as discrete cosine transform (DCT), Hadamard transform, wavelets, or any other suitable transformation process know to those skilled in the art. As an example, an original photo image may be transformed into two-dimensional N×N blocks (e.g., 8×8 blocks), and a DCT formula may be applied to each row and column of the N×N matrix overlaying the image such that each block has a corresponding transformation coefficient. In other embodiments, there may be multiple transformation coefficients corresponding to each block.

The transformation coefficients are then quantized or weighted according to their corresponding importance such that many or most of the transformation coefficients become quantized coefficients having a value of zero. Next, the quantized values or coefficients are coded using some variable length entropy coding methods (e.g., static, adaptive, Huffman coding, arithmetic coding, or any other suitable entropy coding method known to those skilled in the art) in a set or predefined order (e.g., in a zig-zag order). The result of this process may be a coded bitstream that corresponds to the original uncompressed data. In other examples, an original image may be initially divided into partitions, and the compression process described above is performed on each partition of the original image.

For example, given an ordered sequence of transformation coefficients, an encoder adjusts the data size by tuning the values based on some quantization threshold (e.g., quantizer Q). Then, the quantized coefficients are translated into symbols of 1) numbers of consecutive zeroes (e.g., runs), and 2) pairs of non-zero absolute value and sign. Next, either the quantized or approximated non-zero values of the runs of zeroes or the coefficients are packed via some entropy coding.

As an example, the following ordered 16 quantized numbers may be compressed according to the above-described process:

14, 0, 0, 0, 5, −3, 0, 0, 0, 0, 0, 0, 9, 0, −1, 0

The first step of the described process translates this sequence into runs, absolute values, and signs as follows:

(1) r=0, a=14, s=0. (2) r=3, a=5, s=0. (3) r=0, s=1. (4) r=6, a=9, s=0. (5) r=1, a=1, s=1; EOS

With reference to the above, r, a, and s refer to run, absolute value, and sign, respectively, and EOS refers to the end of the sequence. Because the first quantized number is non-zero (i.e., 14), there is no preceding run of zeroes, and therefore r=0, and because the non-zero number has a value of 14 and is a positive number, a=14 (indicating the absolute value) and s=0 (indicating that the sign is positive). Next, there are three zeroes following the first quantized number before another non-zero coefficient is reached (i.e., 5). Accordingly, for the second set of values r=3 (indicating a zero run of 3 numbers), a=5 (indicating that the next non-zero number in the sequence has a value of 5), and s=0 (indicating that the non-zero value is positive). This process of organizing the sequence of quantized numbers continues until the end of the sequence, as indicated by EOS, has been reached. Then, the sequence of r, a, and s values are encoded using any suitable entropy codec or coding scheme known to those skilled in the art. For example, a suitable encoder using one of the coding schemes as previously discussed (e.g., static, adaptive, Huffman coding, arithmetic coding, or any other suitable entropy coding method) may be used.

In sum, the above process organizes or packs a sequence of quantized numbers based on the locations of non-zero coefficients within the sequence and based on the number of zeroes in between the non-zero coefficients. Accordingly, the process is able to translate the information of the sequence into a sequence of runs, absolute values, and sign indicators, allowing for decreased storage and increased efficiency. The translated sequence (e.g., the sequence of runs, absolute values, and signs translated from the sequence of quantized coefficients) is then encoded appropriately.

This data compression algorithm allows both the encoder and the decoder to be built as state machines (e.g., a coefficient is input and bits are output).

To achieve a fixed target bit capacity, or to allow for a limit or cap on the final coded bitstream (e.g., a limit of 256 bits per bitstream), the coefficients may be sliced into bit planes, with the most significant bits being entropy coded first and the less significant bits following, with the coded data ending whenever the target size is reached. In other words, an alternative typical single-pass process may include storing absolute values of coefficients in independent bit-planes, with each bit-plane representing a single bit location or bit position of each coefficient (e.g., the 8-bit bit-plane). This process packs the data from the most significant high bit position to the least significant low bit position such that the more significant bits are packed until the pre-allocated data size (e.g., pre-allocated data corresponding to each block of an image) is reached.

A typical single-pass data compression process using pre-allocated data sizes starts by translating the coefficient entries into pairs of absolute value and sign information, thereby creating bit-planes for the bit position corresponding to the sign of the coefficients and the bit positions corresponding to the bits of the coefficient that are added up to equal the absolute values of the coefficients (e.g., the magnitude bits). Next, the first bit-plane may be generated by encoding the signs of the coefficients, forming a bit-plane representing the signs. Next, bit-planes of the absolute values of the coefficients may be encoded one at a time, from the most significant bit to the least significant bit. And for each bit-plane, the runs of zeroes between the ones (i.e., bits equaling 1) supply the actual coding symbols.

As an example, the same sequence of coefficients as above will be used to describe this encoding scheme:

14, 0, 0, 0, 5, −3, 0, 0, 0, 0, 0, 0, 9, 0, −1, 0

The presently described algorithm first converts the above sequence of coefficients into sign bit and absolute value bit bit-planes, totaling 5 bit-planes altogether, as shown below in Table 1:

TABLE 1

| Coefficients: | 14 | 0 | 0 | 0 | 5 | −3 | 0 | 0 | 0 | 0 | 0 | 0 | 9 | 0 | −1 | 0 |
|---|---|---|---|---|---|---|---|---|---|---|---|---|---|---|---|---|
| Sign: | 0 | — | — | — | 0 | 1 | — | — | — | — | — | — | 0 | — | 1 | — |
| 8: | 1 | 0 | 0 | 0 | 0 | 0 | 0 | 0 | 0 | 0 | 0 | 0 | 1 | 0 | 0 | 0 |
| 4: | 1 | 0 | 0 | 0 | 1 | 0 | 0 | 0 | 0 | 0 | 0 | 0 | 0 | 0 | 0 | 0 |
| 2: | 1 | 0 | 0 | 0 | 0 | 1 | 0 | 0 | 0 | 0 | 0 | 0 | 0 | 0 | 0 | 0 |
| 1: | 0 | 0 | 0 | 0 | 1 | 1 | 0 | 0 | 0 | 0 | 0 | 0 | 1 | 0 | 1 | 0 |

Table 1 illustrates the 5 derived bit-planes: the sign bit-plane, the 8-bit bit-plane, the 4-bit bit-plane, the 2-bit bit-plane, and the 1-bit bit-plane. The sign bit-plane contains information related to the sign of each coefficient (e.g., a 0 bit when the sign is positive and a 1 bit when the sign is negative). The remaining magnitude or absolute value bit-planes contain a 1 when the respective coefficient includes that bit value such that the four absolute value bit-planes can be vertically added to equal the magnitude of the corresponding coefficient. For example, the coefficient −3 is parsed with a 1 bit in the sign bit-plane, a 1 bit in the 2-bit bit plane, and a 1-bit in the 1-bit bit-plane, thereby indicating that the coefficient is negative and has an absolute value of 3 (i.e., 1+2=3).

Next, the compression scheme encodes the sign bit-plane and the four absolute value bit-planes, relying on the 1 bits present in each bit-plane and the runs of zero bits in between the 1 bits. The process may utilize any suitable entropy codec or coding scheme known to those skilled in the art to encode the bit-plane data. The bit-planes are encoded until the target data size is reached. Table 2 below illustrates the results of encoding the values of Table 1.

TABLE 2

| Sign: | 5 | 8 | EOS | — | — |
|---|---|---|---|---|---|
| 8: | 0 | 11 | EOS | — | — |
| 4: | 0 | 3 | EOS | — | — |
| 2: | 0 | 4 | EOS | — | — |
| 1: | 4 | 0 | 6 | 1 | EOS |

Referring to Table 2, the encoded 8-bit bit-plane first includes a "0" because the first bit of the bit-plane contains a "1." The next encoded value of the 8-bit bit-plane is an "11," indicating a run of 11 zeroes before the next 1 bit value. Finally, because there are no more following 1 bits, the encoded 8-bit bit-plane includes the EOS after the "11."

The encoded 4-bit bit-plane first includes a "0" because the first bit of the bit-plane contains a "1." The next encoded value of the 4-bit bit-plane is a "3," indicating a run of 3 zeroes before the next 1 bit value. Finally, because there are no more following 1 bits, the encoded 4-bit bit-plane includes the EOS after the "3."

The encoded 2-bit bit-plane first includes a "0" because the first bit of the bit-plane contains a "1." The next encoded value of the 2-bit bit-plane is a "4," indicating a run of 4 zeroes before the next 1 bit value. Finally, because there are no more following 1 bits, the encoded 2-bit bit-plane includes the EOS after the "4."

The encoded 1-bit bit-plane first includes a "4" because each of the first 4 bits of the bit-plane is "0." The next encoded value of the 1-bit bit-plane is a "0," indicating no run of zeroes before the next 1 bit value. The next encoded value of the 1-bit bit-plane is a "6," indicating a run of 6 zeroes before the next 1 bit value. The next encoded value of the 1-bit bit-plane is a "1," indicating a run of one zero before the next 1 bit value. Finally, because there are no more following 1 bits, the encoded 1-bit bit-plane includes the EOS after the "1."

Although the above encoding method using bit-planes allows for fixed data sizes for blocks of an image, the described bit-plane compression method uses a buffer memory to store all coefficient data, as the process is performed sequentially.

FIG. 1 is a flowchart illustrating an encoding process according to an embodiment of the present invention.

Referring to FIG. 1, the flowchart 100 of an encoding process according to an example embodiment of the present invention illustrates the process beginning with coefficients, to the generation of bit-planes, to the encoding, and ending with a final coded bitstream. The encoding process 100 begins with a series of quantized coefficients at 102. The encoding process 100 utilizes a number of registers (e.g., registers 204 of FIG. 2). The registers include a sign register and bit registers that represent different magnitudes of bits. For example, the registers may include registers for the 1-bit, the 2-bit, the 4-bit, and the 8-bit, resulting in five total registers including the sign register (i.e., four bit registers and one sign register). The encoder according to the present embodiment, instead of creating bit-planes for all coefficients as described above, operates by decomposing each coefficient entry and encoding all bits in parallel.

The decomposition of each coefficient occurs in a similar manner as described above in connection with Table 2. As such, the quantized coefficients at 102 are each in the form illustrated in Table 2, with each coefficient having a sign bit parameter and magnitude bit parameters. The decomposition of each coefficient includes organizing the coefficient into a sign bit (e.g., "s") and corresponding magnitude bits (e.g., "$a_K \ldots a_1, a_0$").

The encoding process 100 functions by operating on or packing a first coefficient in the sequence of coefficients input into the process 100. After the first coefficient, the encoding process 100 moves to the next coefficient in the sequence of coefficients 102 and repeats the process until there are no coefficients remaining. The sign and magnitude bits may be represented by corresponding registers (e.g., rs, $ra_K \ldots ra_1, ra_0$).

At 104, the encoder determines whether or not the sign bit "s" of the coefficient being operated on is 0 (e.g., whether or not the sign of the coefficient is positive). When the sign bit of the coefficient equals 0 (e.g., when the sign of the coefficient is positive), the register rs associated with the sign bit is increased by 1 at 106. On the other hand, when the sign bit s of the coefficient is not 0 (e.g., when the sign bit equals 1, which indicates that the coefficient is negative), the sign register rs is encoded at 108 and the sign register rs is reset to 0. The encoding may be performed as any suitable encoding method known to those skilled in the art, for example, any of the encoding methods discussed above (e.g., static, adaptive, Huffman coding, arithmetic coding, or any other suitable entropy coding method).

Concurrently, the magnitude bits $a_K \ldots a_1, a_0$ of the coefficient being operated on undergo the same treatment. For example, at 110, the encoder determines whether or not the bit $a_K$, which represents the largest bit magnitude, of the coefficient being operated on, is 0 (e.g., whether or not the coefficient includes that bit magnitude). The largest magnitude bit $a_K$ may be any suitable magnitude according to embodiments of the present invention (e.g., $a_K$ may represent a magnitude of 8). When the largest magnitude bit of the coefficient equals 0, the register associated with the largest magnitude bit $ra_K$ is increased by 1 at 112. On the other hand, when the largest magnitude bit of the coefficient is not 0 (e.g., when the largest magnitude bit equals 1), the largest magnitude bit register $ra_K$ is encoded and the register is reset to 0 at 114. This operation is similarly performed on the remaining bits of the coefficient. In some embodiments of the present invention, the registers are initialized to 0 before the sequence of coefficients are operated on.

After operating on a coefficient in the sequence of coefficients, at 116, the encoding process 100 determines whether or not there is a next coefficient in the sequence of coefficients. At 118, when there is a next coefficient in the sequence of coefficients, the process returns to the sequence of coefficients at 102 to retrieve the decomposed next coefficient, and the encoder operates in parallel (e.g., concurrently or simultaneously) on the bits of the next coefficient in the same manner as described above.

The bits of the decomposed coefficients are encoded into respective coded bitstreams 120, each of the bitstreams corresponding to respective bit positions that constitute each coefficient (e.g., a coded bitstream corresponding to the sign bits of the coefficients, a coded bitstream corresponding to the largest magnitude bits $a_K$ of the coefficients, etc.).

At 122, if there is no next coefficient in the sequence of coefficients, the encoder sends an end of sequence (EOS) signal and resets all registers to 0. At 124, the encoder repeats the encoding process for another sequence of coefficients that represent another block of data (e.g., another block of data of an image). Concurrently (e.g., simultaneously), at 124, the encoder merges the coded bitstreams encoded (108) by the encoders, resulting in the coded bitstream 126. The coded bitstreams representing the sign bit and the bit-planes are interlaced in parallel or serially merged. The encoding process may continue until all the blocks of data have been encoded.

By way of example, a sequence of coefficients may include the sequence of Table 1 above: 14, 0, 0, 0, 5, −3, 0, 0, 0, 0, 0, 0, 9, 0, −1, 0. According to embodiments of the present invention, the five bit-planes (e.g., the sign bit-plane, the 8-bit bit-plane, the 4-bit bit-plane, the 2-bit bit-plane, and the 1-bit bit-plane) are not explicitly converted, but the five registers corresponding to the five bit-planes are maintained (e.g., r_s, r_8, r_4, r_2, and r_1). The five registers keep track of the zero-runs in each bit-plane. Embodiments of the present invention may utilize decomposed coefficients, for example, coefficients decomposed into bits, as shown above in Table 1.

The encoding process begins with the first coefficient in the sequence (i.e., 14). Because each of the sign bit and the 1-bit corresponding to the coefficient 14 is 0, the respective registers r_s and r_1 are increased by 1. Furthermore, because each of the 8-bit, the 4-bit, and the 2-bit corresponding to the coefficient 14 is 1, the respective registers $r\_8$, $r\_4$, and $r\_2$ are encoded and are reset to 0 (in this case, maintained at 0).

The process then moves to the next coefficient, 0. Because all bits are 0, each of the registers $r\_s$, $r\_8$, $r\_4$, $r\_2$, and $r\_1$ are increased by 1. Because the next coefficient is also 0, all of the registers are again increased by 1. Again, because the next coefficient is also 0, all the registers are again increased by 1. The next coefficient after the third 0 is 5. Because each of the sign bit, the 8-bit, and the 2-bit corresponding to the coefficient 5 is 0, the respective registers $r\_s$, $r\_8$, and $r\_2$ are increased by 1. Furthermore, because each of the 4-bit and the 1-bit corresponding to the coefficient 5 is 1, the respective registers $r\_4$, and $r\_1$ are encoded and are reset to 0. In this case, because $r\_4=3$ and $r\_1=4$ at this point in the process, these stored values are encoded, and $r\_4$ and $r\_1$ are reset to 0.

The next coefficient is −3. Because each of the 8-bit and the 4-bit corresponding to the coefficient 3 is 0, the respective registers $r\_8$ and $r\_4$ are increased by 1. Furthermore, because each of the sign bit, the 2-bit, and the 1-bit corresponding to the coefficient −3 is 1, the respective registers $r\_s$, $r\_2$, and $r\_1$ are encoded and are reset to 0. In this case, because $r\_s=5$, $r\_2=4$, and $r\_1=0$ at this point in the process, these stored values are encoded, and $r\_s$, $r\_2$, and $r\_1$ are reset to 0 (or maintained at 0). The process continues until the end of the sequence of coefficients. This described encoding process according to an embodiment of the present invention is summarized below with respect to the first six coefficients in the sequence:

14: $r\_s+=1$, $r\_1+=1$; encode: $r\_8=0$, $r\_4=0$, and $r\_2=0$
0: $r\_s+=1$, $r\_8+=1$, $r\_4+=1$, $r\_2+=1$, and $r\_1+=1$
0: $r\_s+=1$, $r\_8+=1$, $r\_4+=1$, $r\_2+=1$, and $r\_1+=1$
0: $r\_s+=1$, $r\_8+=1$, $r\_4+=1$, $r\_2+=1$, and $r\_1+=1$
5: $r\_s+=1$, $r\_8+=1$, $r\_2+=1$; encode: $r\_4=3$ and $r\_1=4$; reset: $r\_4=r\_1=0$
−3: $r\_8+=1$, $r\_4+=1$; encode: $r\_s=5$, $r\_2=4$, and $r\_1=0$; reset: $r\_s=r\_2=r\_1=0$ FIG. 2 is a schematic block diagram illustrating an encoding system according to an embodiment of the present invention.

Figure 2:
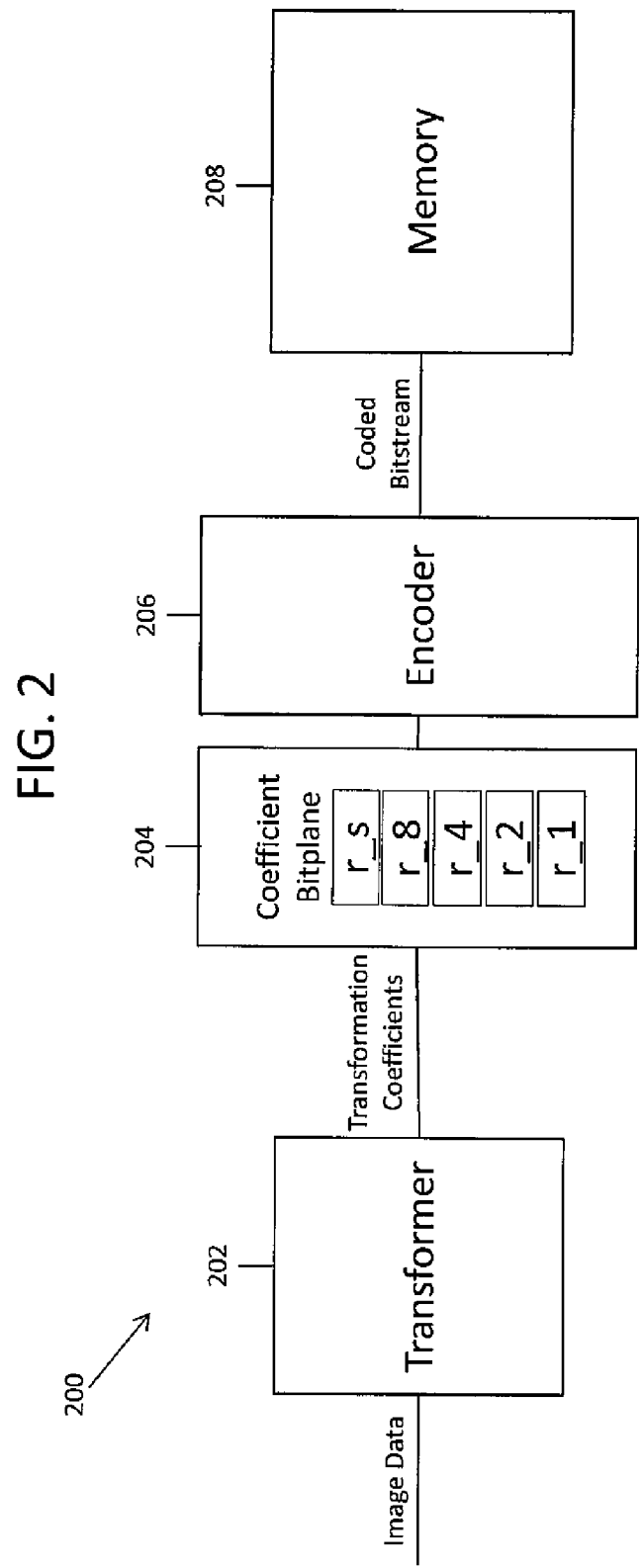
FIG. 2 is a schematic block diagram illustrating an encoding system according to an embodiment of the present invention.

Referring to FIG. 2, the encoding system 200 begins with image data that is input into a transformer 202. The image data may contain red-green-blue (RGB) pixel information. The image data may correspond to a still picture or may correspond to a moving image or a video (e.g., a frame of a video). The transformer 202 converts the image data into transformation coefficients. The transformer 202 may operate by using any suitable transformation technique known to those skilled in the art, for example, discrete cosine transform (DCT), Hadamard transform, wavelets, etc. In some embodiments of the present invention, the transformation coefficients are similar to the coefficients described above in connection with FIG. 1.

The transformation coefficients are sent to a plurality of registers 204 which correspond to coded bitplanes. The registers 204 are used to organize and pack the transformation coefficients. The registers 204 may include any suitable number of registers as desired or needed. In the present embodiment, the coded bitplane registers include five registers: a sign register ($r\_s$), an 8-bit register ($r\_8$), a 4-bit register ($r\_4$), a 2-bit register ($r\_2$), and a 1-bit register ($r\_1$). The registers 204 are configured to track information regarding each coefficient, as described above in connection with FIG. 1. In embodiments of the present invention, the registers 204 organize the bits of each coefficient in parallel (e.g., concurrently or simultaneously). In other words, the registers 204 track the information associated with each transformation coefficient such that once a coefficient is operated on, that coefficient may be discarded and the coefficient need not be stored in an intermediate memory.

As the registers 204 pack the transformation coefficients, the values of some registers 204 are encoded, for example, whenever the registers encounter a 1-bit. The values of these registers that are to be encoded are sent to encoder 206. The encoder 206 outputs a coded bitstream, as discussed above in reference to FIG. 1. The coded bitstream is the encoded or compressed data that corresponds to the uncompressed or original image pixel data sent to the transformer 202. The coded bitstream is stored in memory 208 so that it is accessible for decoding when desired, or to be transmitted to a decoder of another device.

A person of ordinary skill in the art will recognize that the transformer module and the encoder module may be combined into a single module or divided into other submodules. Each of the modules may be implemented via one or more ASICs, FPGAs, programmed microprocessors and/or the like, that are configured to perform the specified functions of the transformer and the encoder modules. For example, the microprocessors may be coupled to a memory storing computer instructions which, when executed by the microprocessor, allow the specified functions to occur. Furthermore, in some embodiments, the registers and the encoder are incorporated in a single module.

Figure 3:
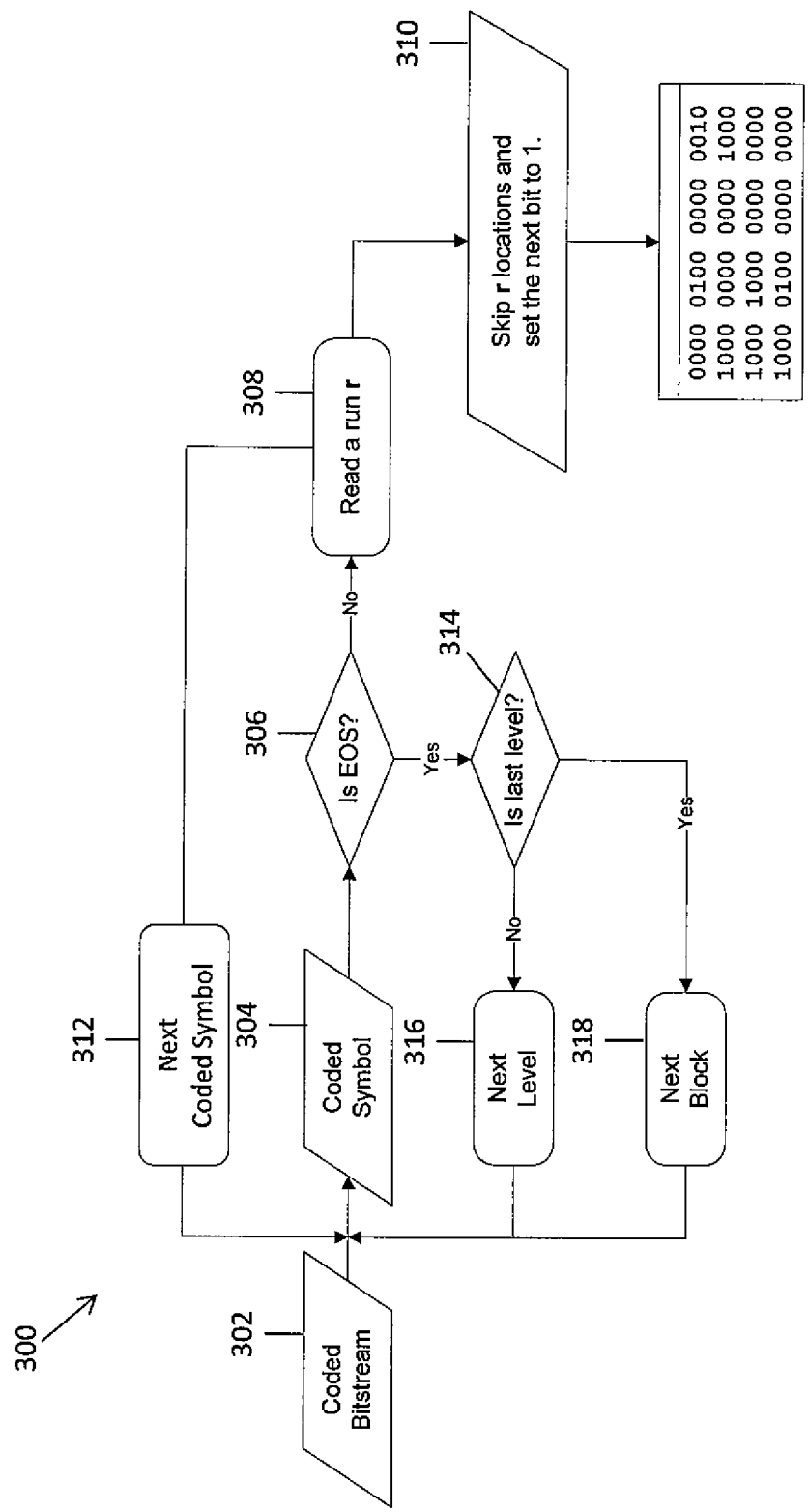
FIG. 3 is a flowchart illustrating a decoding process according to an embodiment of the present invention.

FIG. 3 is a flowchart illustrating a decoding process according to an embodiment of the present invention.

Referring to FIG. 3, the decoding process 300 of compressed or encoded information according to the present embodiment begins with a coded bitstream 302. The coded bitstream 302 may be created in accordance with embodiments of the present invention, for example, in accordance with the embodiment of the present invention illustrated in FIG. 1. The coded bitstream is stored in some designated memory and represents the final coded values in a bit-plane order (e.g., the horizontal scanning order from left to right of Table 2). The coded bitstream may have been received over a transmission medium, for example.

The decoding process 300 unpacks or decompresses the stored coded bitstream 302. The decoding process 300 parses the coded bitstream that includes a sequence of coded symbols. At 304, a coded symbol in the coded bitstream is read or detected. At 306, it is determined whether or not the coded symbol is an EOS symbol, which signals the end of sequence of the bit-planes.

When an EOS symbol is not detected, at 308, a run r is read or detected. The run r is equal to the value of the coded symbol (e.g., a coded symbol of 5 represents a run of 5 bits). The run r refers to the number of consecutive zeroes in a particular bit-plane. After the run r of the coded symbol is read, at 310, r locations or positions (i.e., the value of the run) are skipped and the next bit after the r bits is set to a 1 bit. The bit values of the skipped locations or positions are output at 0. The run r occurs horizontally along a particular bit plane. For example, when a coded symbol of 5 corresponding to the 8-bit bit-plane is read, 5 zeroes along the 8-bit bit-plane are placed or output and the sixth bit position after the 5 zeroes is set to a 1 bit. After reading the run r, at 312, the next coded symbol of the bit-plane being operated on is read, and the process restarts at 304 with the next coded symbol.

When the decoding process 300 does detect an EOS symbol, the process 300 next determines whether or not the detected EOS corresponds to the last level of the bit planes at 314. At 316, when the EOS does not correspond to the last bit-plane level, the decoding process 300 advances to the next bit-plane level. On the other hand, at 318, when the EOS does correspond to the last bit-plane level, the decoder advances to the next block of coded data and proceeds to unpack the data by reading the first coded symbol of the next block at 304. The next block of data may correspond to a next block of an image.

For example, the encoded bitstream may have the information shown in Table 3 in order:

TABLE 3

| Sign: | 5 | 8  | EOS |
|-------|---|----|-----|
| 8:    | 0 | 11 | EOS |
| 4:    | 0 | 3  | EOS |
| 2:    | 0 | 4  | EOS |

Note that this information is similar to the information above in Table 2 except that the 1-bit bit-plane information is no longer available. As noted above, embodiments of the present invention allow for fixed data size encoding, and therefore, due to the fixed data size constraints, the 1-bit bit-plane may not be encoded when the data capacity is met after the 2-bit bit-plane is encoded. Accordingly, the 1-bit bit-plane information is not encoded and not stored for availability at the decoding stage. In other embodiments, different fixed data capacities may be adhered to at the encoding stage, for example, the 2-bit bit-plane and the 1-bit bit-plane may not be included in the final coded bitstream.

According to the present embodiment, the above encoded bitstream is decoded horizontally across each bit-plane from the top bit-plane level to the bottom bit-plane level (e.g., the last bit-plane). The decoder according to the present embodiment horizontally splits out the encoded symbols into bit-planes including bits rather than coded symbols, generating the results shown below in Table 4.

TABLE 4

| Sign: | 0 | — | — | — | 0 | 1 | — | — | — | — | — | — | 0 | — | 1 | — |
|-------|---|---|---|---|---|---|---|---|---|---|---|---|---|---|---|---|
| 8:    | 1 | 0 | 0 | 0 | 0 | 0 | 0 | 0 | 0 | 0 | 0 | 0 | 1 | 0 | 0 | 0 |
| 4:    | 1 | 0 | 0 | 0 | 1 | 0 | 0 | 0 | 0 | 0 | 0 | 0 | 0 | 0 | 0 | 0 |
| 2:    | 1 | 0 | 0 | 0 | 0 | 1 | 0 | 0 | 0 | 0 | 0 | 0 | 0 | 0 | 0 | 0 |

After grouping the bit-planes vertically, the following sequence of coefficients results:

14, 0, 0, 0, 4, −2, 0, 0, 0, 0, 0, 0, 8, 0, 0, 0

When compared with the original coefficients shown in Table 1, there are slight differences as a result of dropping the 1-bit bit-plane at the encoding stage, but the results are still similar while having the capability of implementing fixed data limits at the bit-plane level and while saving memory. For example, a codec design according to embodiments of the present invention may have a synthesized gate count less than 40,000 for the encoder, and less than 60,000 for the decoder. Accordingly, embodiments of the present invention may provide 10 times less computational complexity in comparison with conventional video and image codecs.

Figure 4:
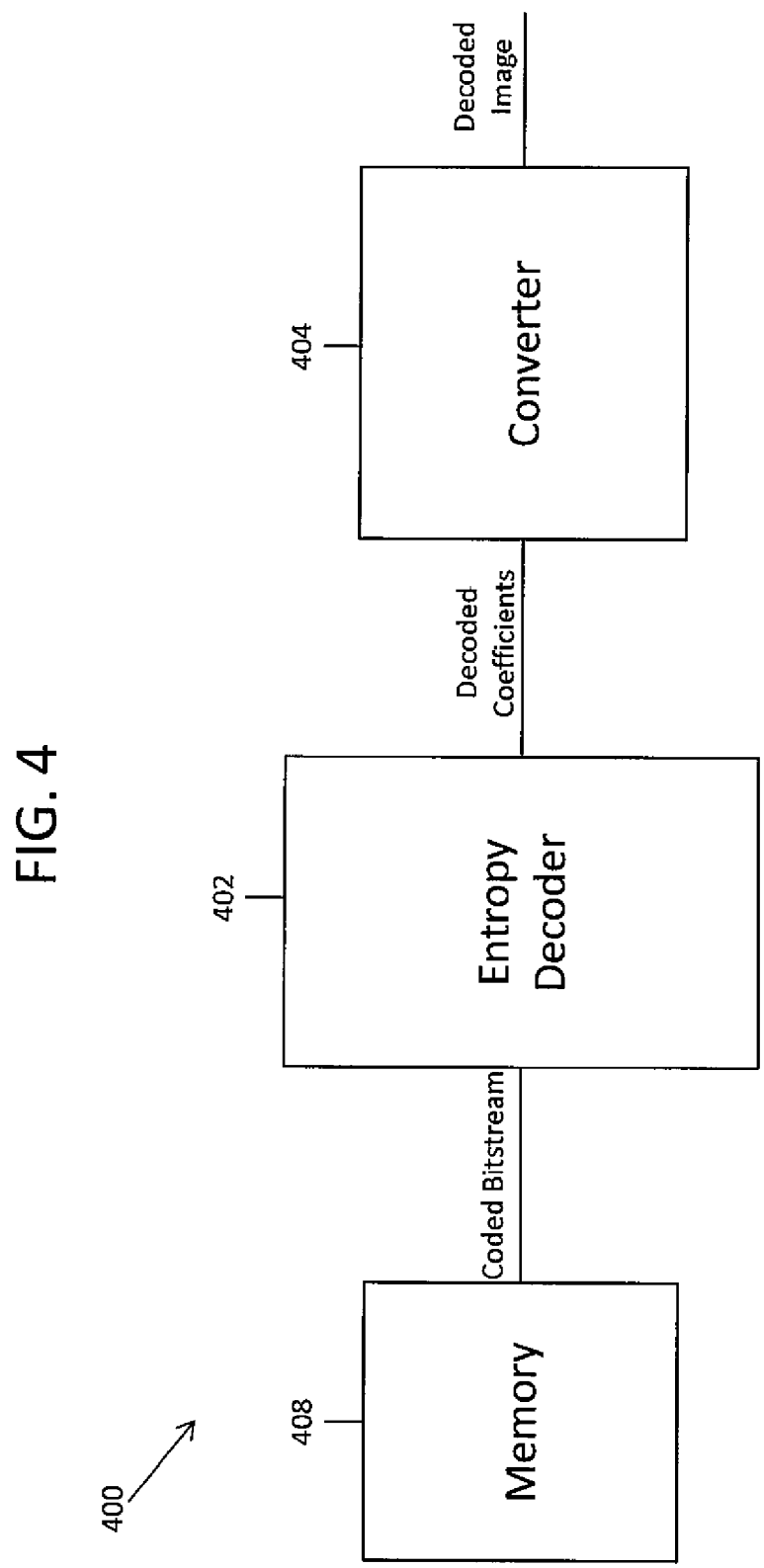
FIG. 4 is a schematic block diagram illustrating a decoding system according to an embodiment of the present invention.

FIG. 4 is a schematic block diagram illustrating a decoding system according to an embodiment of the present invention.

Referring to FIG. 4, the decoding system 400 accesses the coded bitstream (e.g., the bit-planes including coded symbols) that is stored in memory 408. The coded bitstream is transmitted to the entropy decoder 402 that is configured to decode or unpack the coded bitstream and to generate decoded coefficients (e.g., the bit-planes including bits corresponding to the sign and magnitudes of coefficients). The compressed or coded data may be decompressed or decoded according to embodiments of the present invention, for example, according to the method described in connection with FIG. 3. The decoded coefficients are sent to a converter 404 configured to convert the decoded coefficients into a decoded image (e.g., by adding the vertical columns of the bit-planes, as described above). For example, the decoded image may be an image for display for use by an end user at a computer.

A person of ordinary skill in the art will recognize that the decoder module and the converter module may be combined into a single module or divided into other sub-modules. Each of the modules may be implemented via one or more ASICs, FPGAs, programmed microprocessors and/or the like, that are configured to perform the specified functions of the decoder and the converter modules. For example, the microprocessors may be coupled to a memory storing computer instructions which, when executed by the microprocessor, allow the specified functions to occur.

The encoder and decoder according to embodiments of the present invention may be utilized in a variety of applications. For example, embodiments of the present invention may be implemented in display panels, cellular phones, computers, and other devices where data compression is desired.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An encoder for encoding image data and comprising a plurality of registers and configured to:

sequentially receive an array of coefficients, each of the coefficients being decomposed into a plurality of bits located at a plurality of corresponding bit positions of the coefficient, each bit position corresponding to one of the plurality of registers;

concurrently operate on the plurality of bits of each of the coefficients by sequentially reading each of the plurality of the bits, by increasing a corresponding one of the registers for each of the bits equal to 0, and by resetting the corresponding one of the registers for each of the bits equal to 1;

in response to detecting the bit of the plurality of bits being 1, generate a coded symbol by encoding a value of the register corresponding to the bit position corresponding to the bit;

in response to detecting the bit of the plurality of bits being 1, reset the register corresponding to the bit position corresponding to the bit to zero;

generate a plurality of coded bit-plane levels comprising a plurality of coded symbols;

in response to detecting an end of the array of coefficients, send a plurality of end of sequence (EOS) signals to the plurality of coded bit-plane levels; and in response to detecting the end of the array of coefficients, reset the plurality of registers to zero.

2. The encoder of claim 1, wherein the value of the register corresponding to the bit position corresponding to the bit position of the bit represents a zero run of the bit position.

3. The encoder of claim 1, wherein the bit positions of each coefficient form a plurality of respective bit-plane levels.

4. The encoder of claim 1, wherein a first bit position of the plurality of bit positions represents a sign of each coefficient.

5. A decoder for decoding image data and configured to:

receive a sequence of coded symbols arranged in a plurality of bit-planes, each of the bit-planes corresponding to a bit position of a plurality of coefficients;

read two or more coded symbols of the sequence of coded symbols corresponding to different respective bit-planes of the plurality of bit-planes;

in response to detecting each of the two or more coded symbols as being a run value, output a number of 0-bit bits equal to the run value in a corresponding one of the bit-planes;

after outputting the number of 0-bit bits, output a 1-bit in the corresponding one of the bit-planes;

in response to detecting the coded symbol as being an end of sequence (EOS) symbol, read a next coded symbol of the sequence of coded symbols corresponding to a next bit-plane of the plurality of bit-planes; and in response to detecting the EOS symbol as corresponding to a last bit-plane of the plurality of bit-planes, receive another sequence of coded symbols.

6. A method of encoding image data using an encoder comprising a plurality of registers, the method comprising:

sequentially receiving an array of coefficients, each of the coefficients being decomposed into a plurality of bits located at a plurality of corresponding bit positions of the coefficient, the bit positions of each coefficient forming a plurality of respective bit-plane levels, and each bit position corresponding to one of the plurality of registers;

concurrently operating on the plurality of bits of each of the coefficients by sequentially reading each of the pluralities of the bits, by increasing a corresponding one of the registers for each of the bits equal to 0, and by resetting the corresponding one of the registers for each of the bits equal to 1;

in response to detecting the bit of the plurality of bits being 1, generating a coded symbol by encoding a value of the register corresponding to the bit position corresponding to the bit;

in response to detecting the bit of the plurality of bits being 1, resetting the register to zero;

generating a plurality of coded bit-plane levels comprising a plurality of coded symbols;

in response to detecting an end of the-array of coefficients, sending a plurality of end of sequence (EOS) signals to the plurality of coded bit-plane levels; and in response to detecting the end of the array of coefficients, resetting the plurality of registers to zero.

7. The method of claim 6, further comprising, in response to detecting a bit of the plurality of bits being 0, increasing by 1 a register corresponding to a bit position of the plurality of bit positions corresponding to the bit.

8. The method of claim 7, wherein the value of the register represents a zero run of the bit position.

9. The method of claim 6, wherein a first bit position of the plurality of bit positions represents a sign of each coefficient.

* * * * *